(12) United States Patent
Camilleri et al.

(10) Patent No.: US 9,467,030 B2
(45) Date of Patent: Oct. 11, 2016

(54) AIR-COOLED ELECTRIC MACHINE AND METHOD OF ASSEMBLING THE SAME

(71) Applicant: REGAL BELOIT AUSTRALIA PTY LTD., Rowville, VIC (AU)

(72) Inventors: Steven Peter Camilleri, Darwin (AU); Stephen Scott Nurse, Clifton Hill (AU); Matthew John Turner, Melbourne (AU); Rafal Pawel Rohoza, Surrey Hill (AU)

(73) Assignee: Regal Beloit Australia Pty Ltd, Rowville, Victoria (AU)

( * ) Notice: Subject to any disclaimer, the term of this patent is extended or adjusted under 35 U.S.C. 154(b) by 733 days.

(21) Appl. No.: 13/833,207

(22) Filed: Mar. 15, 2013

(65) Prior Publication Data

US 2014/0265664 A1   Sep. 18, 2014

(51) Int. Cl.
*H02K 9/00* (2006.01)
*H02K 15/14* (2006.01)
*H02K 9/14* (2006.01)
*H02K 9/22* (2006.01)

(52) U.S. Cl.
CPC ............ *H02K 15/14* (2013.01); *H02K 9/14* (2013.01); *H02K 9/22* (2013.01); *H02K 11/33* (2016.01); *Y10T 29/49009* (2015.01)

(58) Field of Classification Search
CPC .................................. H02K 5/14; H02K 9/06
USPC ........................ 310/58, 59, 60 A, 60 R, 64
See application file for complete search history.

(56) References Cited

U.S. PATENT DOCUMENTS

| | | | |
|---|---|---|---|
| 1,844,193 A * | 2/1932 | Uggla | H02K 9/14 310/57 |
| 3,170,079 A * | 2/1965 | Jaeschke | H02K 7/11 310/105 |
| 5,253,613 A | 10/1993 | Bailey et al. | |
| 2004/0239195 A1* | 12/2004 | Okamura | H01L 25/115 310/68 D |
| 2006/0066155 A1 | 3/2006 | Matin et al. | |
| 2007/0182350 A1 | 8/2007 | Patterson et al. | |
| 2010/0139353 A1 | 6/2010 | Patterson et al. | |
| 2010/0164313 A1 | 7/2010 | Langford et al. | |
| 2010/0164316 A1 | 7/2010 | Langford et al. | |
| 2012/0014063 A1 | 1/2012 | Weiss | |

FOREIGN PATENT DOCUMENTS

| | | |
|---|---|---|
| EP | 1742263 A2 | 1/2007 |
| JP | 07143705 A * | 6/1995 |
| WO | 2007035279 A1 | 3/2007 |

OTHER PUBLICATIONS

Australian Patent Examination Report No. 1 for Patent Application No. 2013204027, Jun. 24, 2014; 5 pages.
ISR/WO PCT/AU2014/000275 filed Mar. 14, 2014, mailed Jun. 23, 2014, 9 pages.

* cited by examiner

*Primary Examiner* — Jose Gonzalez Quinones
(74) *Attorney, Agent, or Firm* — Armstrong Teasdale LLP

(57) ABSTRACT

In one aspect, an electric machine is provided. The electric machine includes a housing including at least one air intake, an air outlet, and an air passage extending between the at least one air intake and the air outlet. The electric machine also includes a first heat sink positioned at least partially within the air passage, and a second heat sink positioned at least partially within the air passage downstream of the first heat sink. A cooling airflow through the at least one air intake flows through the air passage to cool the first heat sink and the second heat sink before the cooling airflow is exhausted through the air outlet.

20 Claims, 7 Drawing Sheets

AIR-COOLED ELECTRIC MACHINE AND METHOD OF ASSEMBLING THE SAME

BACKGROUND

The field of the invention relates generally to electrical machines, and more particularly, to air cooling systems for electric machines.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

One problem associated with electric machines is that it is necessary to cool them because they generate heat, which reduces their efficiency and useful life. Motor components such as the stator and electronics boards generate high temperatures and are subjected to substantial thermal stresses. Accordingly, efficient motor cooling systems are necessary to prevent overheating of the motor components and to improve the overall electrical and mechanical performance and lifetime of the motor. Some known electrical machines may be air cooled by blowing air through or over them. However, some known air cooling designs are inefficient.

BRIEF DESCRIPTION

In one aspect, an electric machine is provided. The electric machine includes a housing including at least one air intake, an air outlet, and an air passage extending between the at least one air intake and the air outlet. The electric machine also includes a first heat sink positioned at least partially within the air passage, and a second heat sink positioned at least partially within the air passage downstream of the first heat sink. A cooling airflow through the at least one air intake flows through the air passage to cool the first heat sink and the second heat sink before the cooling airflow is exhausted through the air outlet.

In another aspect, a motor is provided. The motor includes a housing including at least one air intake, an air outlet, and an air passage extending between the at least one air intake and the air outlet. The motor also includes a first heat sink positioned at least partially within the air passage, and a second heat sink positioned at least partially within the air passage downstream of the first heat sink, wherein a cooling airflow through the at least one air intake flows through the passage to cool the first heat sink and the second heat sink before the cooling airflow is exhausted through the air outlet.

In yet another aspect, a method of fabricating an electric motor is provided. The method includes providing a housing including at least one air intake, an air outlet, and an air passage extending between the at least one air intake and the air outlet, positioning a first heat sink at least partially within the air passage, and positioning a second heat sink at least partially within the air passage downstream of the second heat sink. A cooling airflow through the at least one air intake flows through the air passage to cool the first heat sink and the second heat sink before the cooling airflow is exhausted through the air outlet.

DETAILED DESCRIPTION

Systems and methods described herein provide an electric machine having an air cooling system. Electric machines such as motors typically include a motor assembly and electronics that generate high amounts of heat. To extend the lifetime of the electronics, it is important to keep the operating temperature down. The electric machine includes an air passage that facilitates a cooling airflow to cool an electronics heat sink before or separately from a motor heat sink to prevent thermal energy from the motor assembly increasing the electronics temperature and shortening its life. Additionally, a motor enclosure and an electronics enclosure are thermally isolated from each other to facilitate heat exchange between components in the enclosures.

Figure 1:
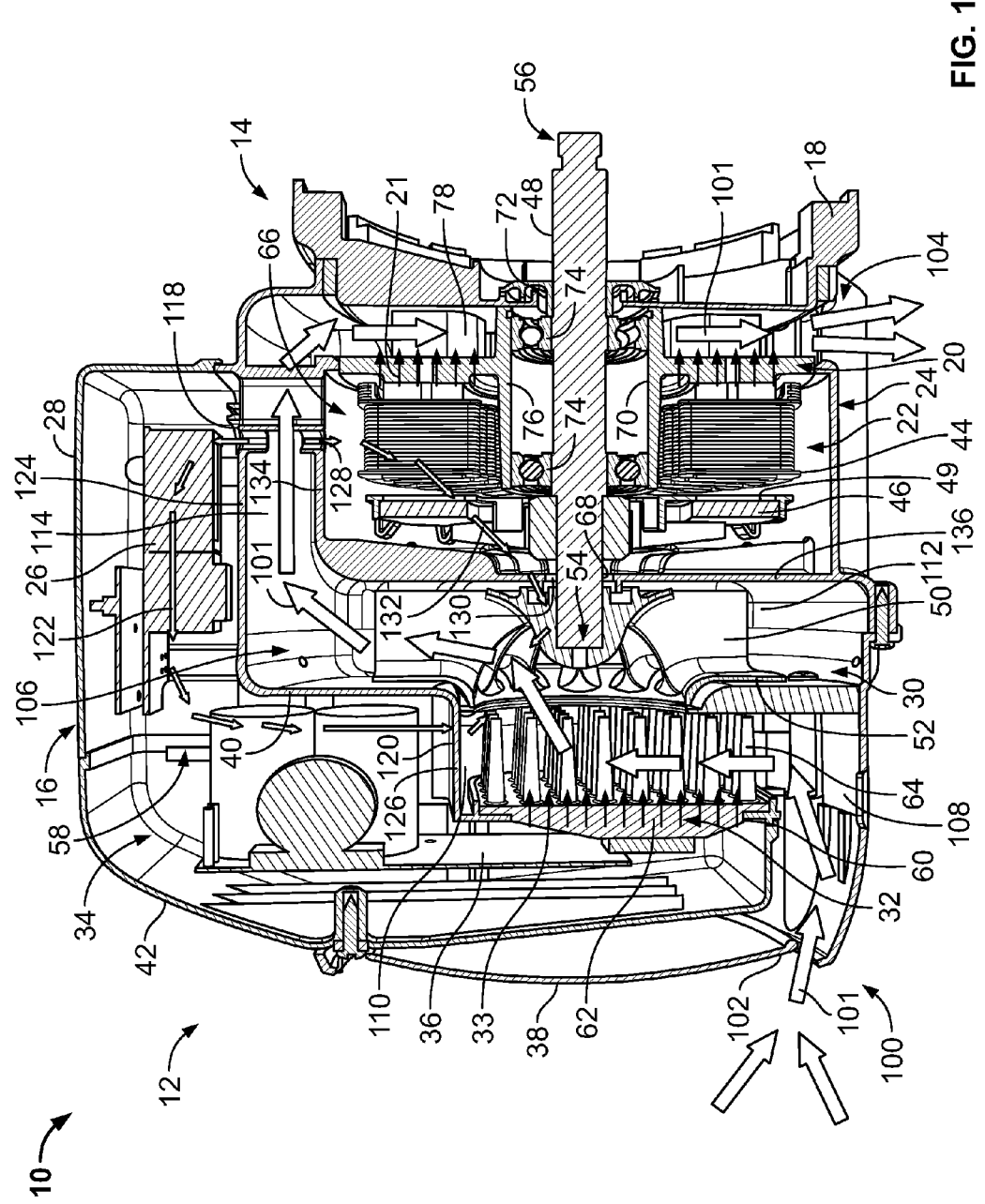
FIG. 1 is a perspective cut-away view of an exemplary electric machine.
Figure 2:
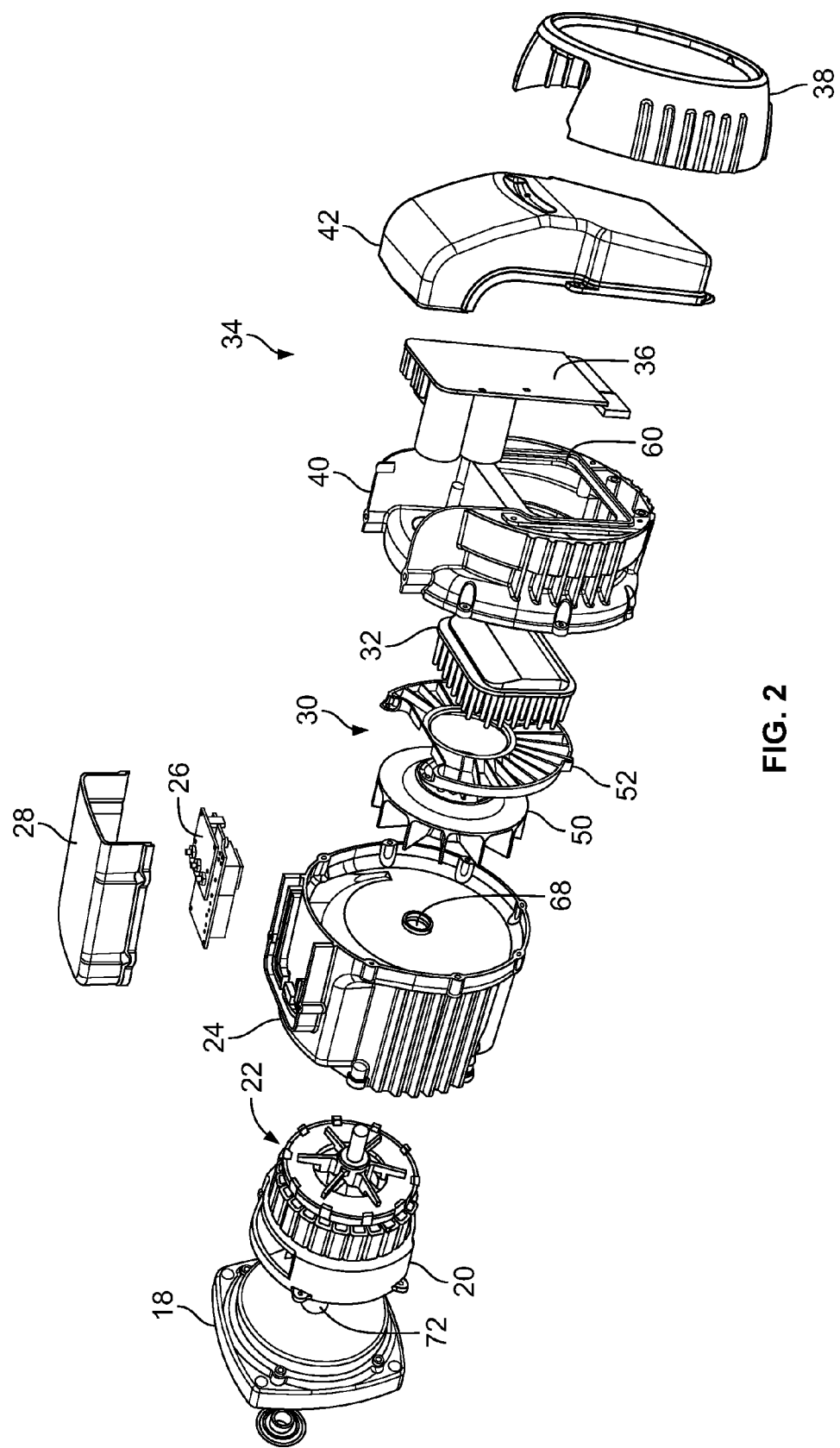
FIG. 2 is an exploded view of the electric machine shown in FIG. 1.

FIG. 1 is a perspective cut-away view of an exemplary axial flux electric machine 10 and FIG. 2 is an exploded view of electric machine 10. Components common to FIGS. 1 and 2 are identified with the same reference numerals. In the exemplary embodiment, electric machine 10 is an electric motor having a first end 12 and a second end 14. Alternatively, electric machine 10 may operate as an electric generator and/or be constructed as a radial flux electric machine. Electric machine 10 generally includes a housing 16, an adaptor plate 18, a motor heat sink 20, a motor assembly 22, a motor enclosure 24, a top controller board 26, a top housing 28, a fan assembly 30, an electronics heat sink 32, an electronics enclosure 34, a controller board or electronics component 36, and an inlet cover 38. Electric machine 10 also includes an air cooling system 100 that facilitates cooling motor assembly 22 and electronics component 36.

In the exemplary embodiment, housing 16 is generally defined by adaptor plate 18, motor enclosure 24, top housing 28, inlet cover 38, and electronics enclosure 34, which is formed by a controller housing 40 and a controller cover 42. Motor assembly 22 generally includes a stator 44 and a rotor 46 coupled to a shaft 48, and a plurality of permanent magnets 49 are coupled to rotor 46 in any suitable configuration. In the exemplary embodiment, stator 44 is oriented adjacent rotor 46 in an axial flux configuration. Alternatively, stator 44 may be oriented at least partially surrounding rotor 46 in a radial flux configuration. Fan assembly 30 generally includes a fan 50 and a fan inlet 52. Fan 50 is coupled to a shaft first end 54, and a shaft second end 56 extends from housing 16 for coupling to a component (not shown) to be driven by rotating shaft 48, for example, a pump. In the exemplary embodiment, rotor 46 is rotatable within housing 16 and, more specifically, rotor 46 is rotatable within motor enclosure 24. Rotor 46 is driven through stator 44 by electronic control 36, for example, a sinusoidal or trapezoidal electronic control.

In the exemplary embodiment, electronics enclosure 34 includes an inner cavity 58 defined by controller housing 40 and controller cover 42. Top controller board 26 is mounted within electronics enclosure 34 and facilitates control of a component of electric machine 10, for example, a user interface (not shown). Electronic control 36 is also mounted within electronics enclosure 34 and facilitates control of motor assembly 22. Electronics enclosure 34 is substantially air-tight and inner cavity 58 is substantially thermally isolated from other portions of electric machine 10. In particular, inner cavity 58 is substantially thermally isolated from motor enclosure 24 to facilitate preventing transfer of thermal energy to electronic control 36, which in many known motors directly affects the useful lifetime of electric machine 10.

Figure 3:
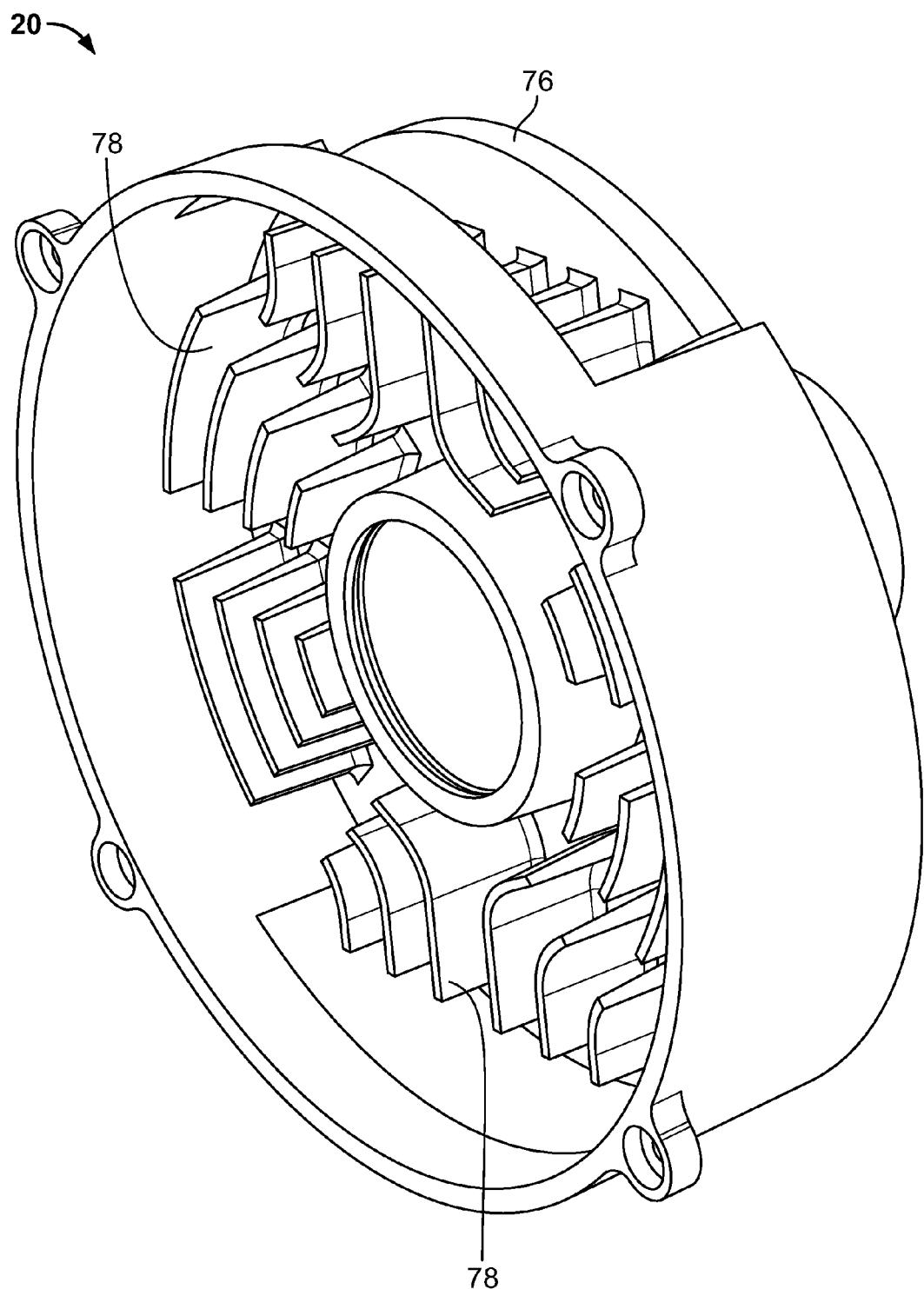
FIG. 3 is a perspective view of a motor heat sink shown in FIGS. 1 and 2.

Electronic control 36 is thermally coupled to electronics heat sink 32 (shown in FIG. 3), which facilitates removal of thermal energy generated by electronic control 36 from electronics enclosure 34 as indicated by arrows 33. In the exemplary embodiment, electronics heat sink 32 extends through and seals an aperture 60 within controller housing 40 and includes a body portion 62 having a plurality of generally cylindrical heat fins 64 extending therefrom. However, heat fins 64 may have any suitable shape that enables heat sink 32 to function as described herein. Body portion 62 is thermally coupled to electronics control 36 and transfers thermal energy generated by electronics control 36 out of inner cavity 58 via heat fins 64, as described herein in more detail.

In the exemplary embodiment, motor enclosure 24 includes an inner cavity 66 defined by motor enclosure 24 and motor heat sink 20. Motor assembly 22 is mounted within motor enclosure 24 and shaft first end 54 extends through an aperture 68 defined in motor enclosure 24. Shaft second end 56 extends through an aperture 70 defined in heat sink 20 and through an aperture 72 defined in adaptor plate 18. In the exemplary embodiment, adaptor plate 18 facilitates attachment of electric machine 10 to a system (not shown) to be driven by shaft 48. Aperture 70 is sealed by shaft 48 and bearings 74 such that air does not pass therethrough. Motor enclosure 24 is substantially air-tight and inner cavity 66 is substantially thermally isolated from other portions of electric machine 10. In particular, inner cavity 66 is substantially thermally isolated from electronics enclosure 34 to facilitate preventing transfer of thermal energy to electronic control 36.

Figure 4:
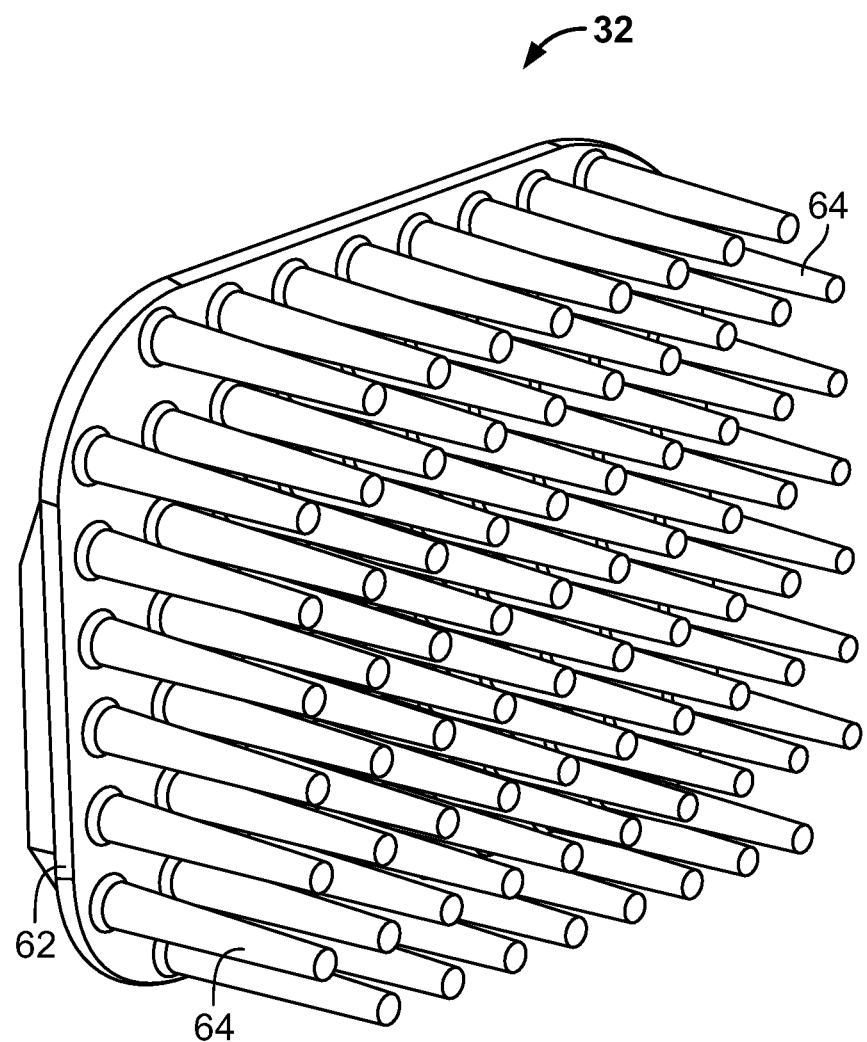
FIG. 4 is a perspective view of an electronics heat sink shown in FIGS. 1 and 2.

Motor assembly 22 is thermally coupled to motor heat sink 20 (shown in FIG. 4), which facilitates removal of thermal energy generated by motor assembly 22 from motor enclosure 24 as indicated by arrows 21. In the exemplary embodiment, motor heat sink 20 extends through and seals aperture 68 and includes a body portion 76 and a plurality of heat fins 78 extending therefrom. Body portion 76 is thermally coupled to stator 44 and thermal energy produced by stator 44 is transferred out of inner cavity via heat fins 78, as described herein in more detail.

As shown in FIG. 1, electric machine 10 includes air cooling system 100 defined by housing 16. Air cooling system 100 generally includes an air intake 102 and an air outlet 104 fluidly connected by an air passage 106 defined through housing 16. In the exemplary embodiment, air passage 106 facilitates a flow of cooling airflow (shown by arrows 101) therethrough to dissipate heat from electronics heat sink 32 and motor heat sink 20. Air passage 106 includes a first portion 108, a second portion 110, a third portion 112, a fourth portion 114, and a fifth portion 116.

In the exemplary embodiment, heat fins 64 are oriented at least partially within passage second portion 110 and heat fins 78 are oriented at least partially within passage fifth portion 116. Fan 50 is coupled to shaft first end 54 and is rotatably mounted within passage third portion 112. Rotation of fan 50 facilitates pulling air into air intake 102 such that the cooling airflow (shown by arrows 101) passes through passage first portion 108 and into passage second portion 110. The cooling airflow contacts heat sink 32 and removes heat generated by electronics component 36 and transferred through electronics heat sink body 62 and heat fins 64. The cooling airflow then passes through passage third portion 112, through passage fourth portion 114, and subsequently through passage fifth portion 116 where the cooling airflow removes heat generated by motor assembly 22 and transferred through motor heat sink body 76 and heat fins 78. The heated airflow is then exhausted from housing 16 through air outlet 104. In the exemplary embodiment, air outlet 104 is located a suitable distance from air intake 102 to facilitate preventing hot exhaust from being drawn back into air intake 102. Moreover, in the exemplary embodiment, electronics heat sink 32 is positioned at least partially within air passage 106 upstream of motor heat sink 20 positioned at least partially within air passage 106. Positioning electronics heat sink 32 upstream of motor heat sink 20 facilitates preventing the motor enclosure thermal energy being transferred to electronics enclosure 34 and electronics component 36 by the cooling airflow.

Air cooling system 100 may also include a first air opening 118 and a second air opening 120 to facilitate directing the cooling airflow through electronics enclosure 34 (as shown by arrows 122). In the exemplary embodiment, first air opening 118 is formed through a wall 124 of motor enclosure 24 such that the cooling airflow passes from passage fourth portion 114 into inner cavity 58. Second air opening 120 is formed through a wall 126 of controller housing 40 such that the cooling airflow passing through first air opening 118 is directed back into air passage 106 past electronics heat sink 32. Alternatively, first and second air openings 118 and 120 may be formed in any suitable location within housing 16 that enables air cooling system 100 to function as described herein. Rotation of fan 50 facilitates directing the cooling airflow through electronics enclosure inner cavity 58 between first air opening 118 and second air opening 120 to facilitate cooling top controller board 26, electronics component 36, and/or any other components positioned within electronics enclosure 34.

Air cooling system 100 may also include a third air opening 128 and a fourth air opening 130 to facilitate directing the cooling airflow through motor enclosure 24 (as shown by arrows 132). In the exemplary embodiment, third air opening 128 is formed through a wall 134 of motor enclosure 24 such that cooling airflow passes from passage fourth portion 114 into inner cavity 66. In the exemplary embodiment, third air opening 128 is positioned substantially across from first air opening 118. Fourth air opening 130 is formed through a wall 136 of motor enclosure 24 and/or may be defined by aperture 68 after shaft 48 is inserted therethrough. Fourth air opening 130 is formed such that the cooling airflow passing through third air opening 130 is directed back into air passage 106 behind fan 50 and downstream of electronics heat sink 32. Alternatively, third and fourth air openings 128 and 130 may be formed in any suitable location within housing 16 that enables air cooling system 100 to function as described herein. Rotation of fan 50 facilitates directing the cooling airflow through motor enclosure inner cavity 66 between third air opening 128 and fourth air opening 130 to facilitate cooling motor assembly 22.

Figure 5:
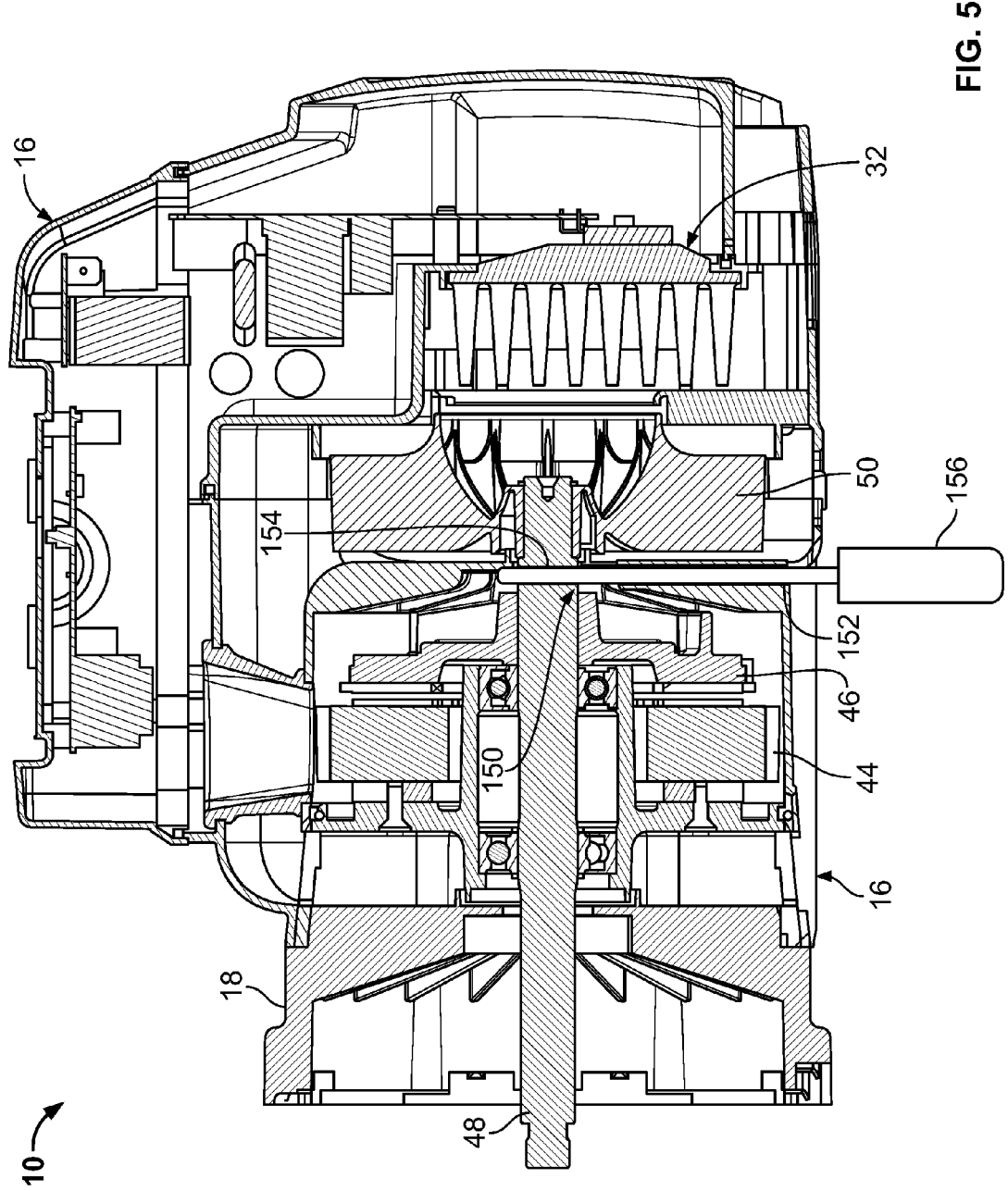
FIG. 5 is a cross-sectional view of the electric machine shown in FIGS. 1 and 2.

FIG. 5 is a cross-sectional view of electric machine 10 that is similar to the electric machine shown in FIGS. 1 and 2, except electric machine includes a shaft locking assembly 150. Like reference numerals have been used to represent like parts. In the exemplary embodiment, shaft locking assembly 150 includes a locking passage 152 formed through housing 16 and a locking aperture 154 formed at least partially through shaft 48. Passage 152 and aperture 154 are substantially aligned such that an object such as a screwdriver 156 may be inserted into passage 152 and aperture 154 to facilitate preventing rotation of shaft 48. When screwdriver 156 is inserted into passage 152 and aperture 154, any torque on shaft 48 is transferred to housing 16 by screwdriver 156 and prevents rotation of shaft 48. This is particularly useful when connecting and disconnecting shaft second end 56 to a driven system (not shown) such as a threaded pump impeller. In the exemplary embodiment, locking passage 152 and locking aperture 154 are located such that screwdriver 156 extends into housing 16 between rotor 46 and fan 50. Alternatively, locking passage 152 may be formed in housing 16 and locking aperture may be formed in shaft 48 in any suitable location that enables shaft locking assembly 150 to function as described herein.

An exemplary method of assembling electric machine 10 is described herein. The method includes providing housing 16 having air intake 102, air outlet 104, and air passage 106 extending between air intake 102 and air outlet 104. Motor enclosure 24 and electronics enclosure 34 are located within housing 16 and are substantially thermally isolated from each other. Motor assembly 22 is coupled within motor enclosure 24 and electronics component 36 is coupled within electronics enclosure 34. Motor heat sink 20 is thermally coupled to motor assembly 22 and is positioned at least partially within air passage 106. Electronics heat sink 32 is thermally coupled to electronics component 36 and is positioned at least partially within air passage 106 upstream of motor heat sink 20. Fan 50 is rotatably mounted within air passage 106 to shaft 48 downstream of electronics heat sink 32, upstream of motor heat sink 20, and generally between motor enclosure 24 and electronics enclosure 34. Moreover, first air opening 118 and second air opening 120 may be formed in housing 16 to fluidly couple air passage 106 to motor enclosure 24 to facilitate a cooling airflow therethrough. Similarly, third air opening 128 and fourth air opening 130 may be formed in housing 16 to fluidly couple air passage 106 to electronics enclosure 34 to facilitate a cooling airflow therethrough. A locking passage 152 may be formed through housing 16 and a locking aperture passage 154 may be formed at least partially through shaft 48 to facilitate receiving an object and preventing rotation of shaft 48.

Figure 6:
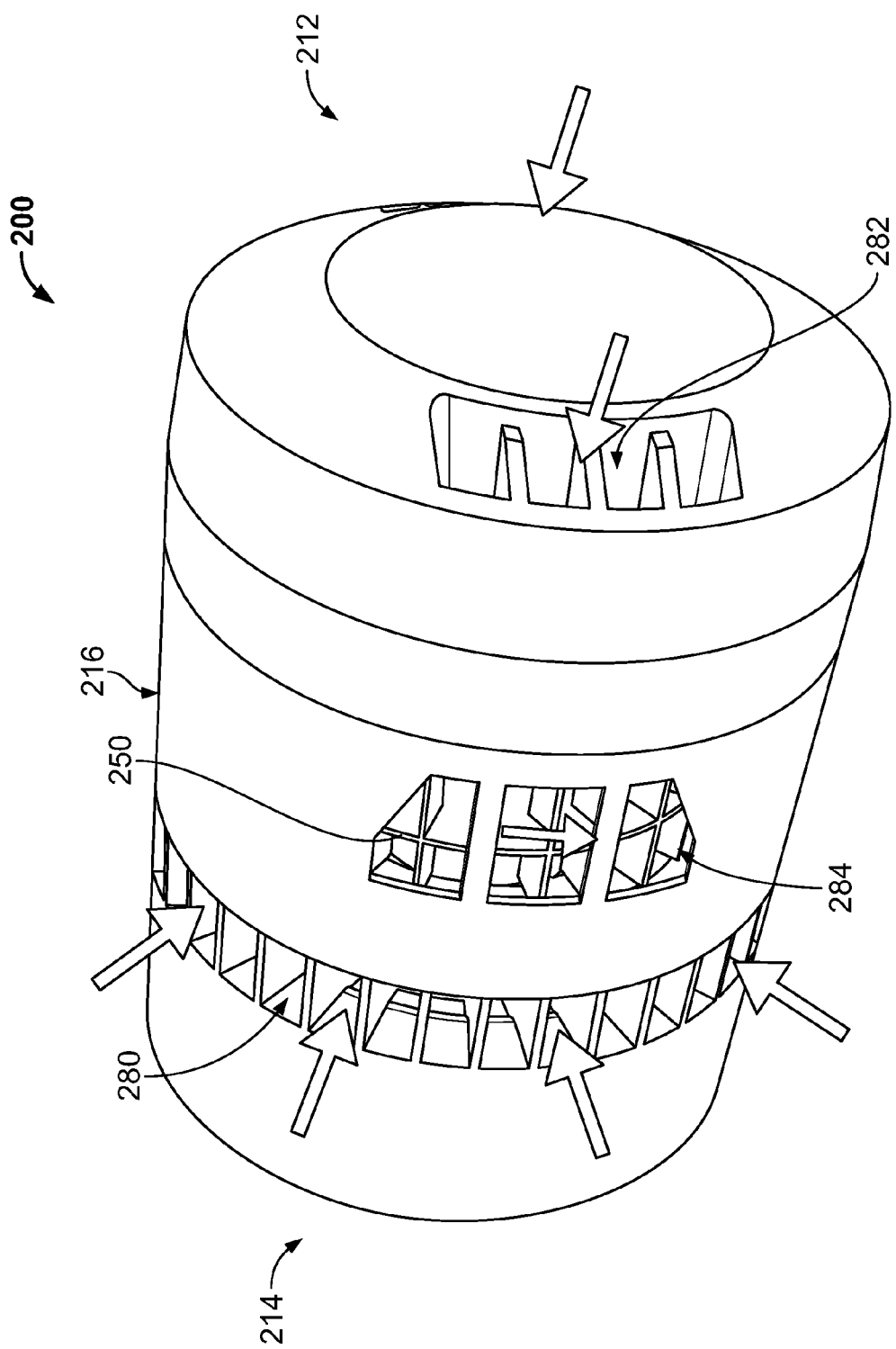
FIG. 6 is a perspective view of another exemplary electric machine.
Figure 7:
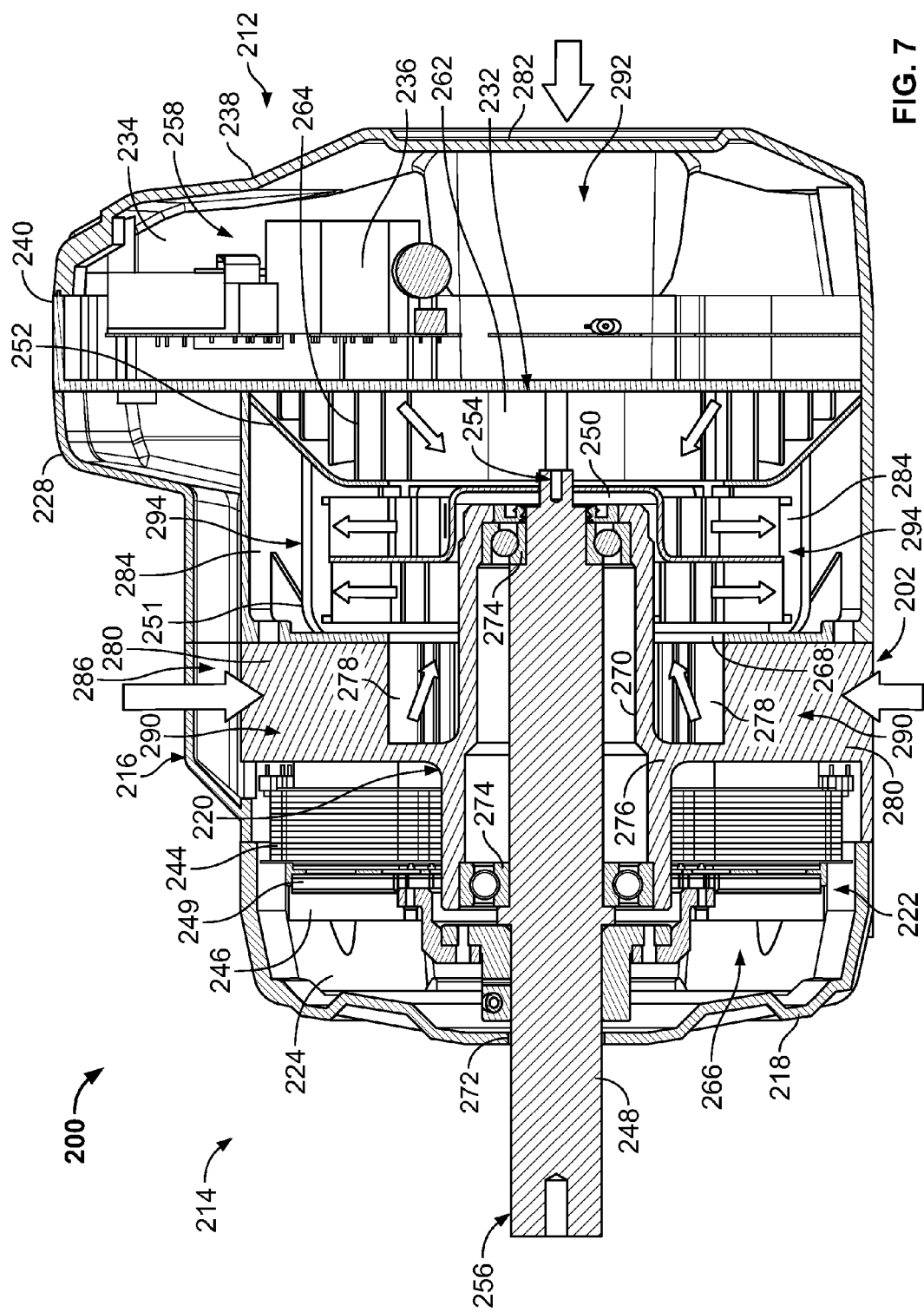
FIG. 7 is a cross-sectional view of the electric machine shown in FIG. 6 and taken along line 7-7.

FIG. 6 is a perspective view of another exemplary axial flux electric machine 200, and FIG. 7 is a cross-sectional view of electric machine 200 that includes an air cooling system 202. In the exemplary embodiment, electric machine 200 is an electric motor having a first end 212 and a second end 214. Alternatively, electric machine 200 may operate as an electric generator and/or be constructed as a radial flux electric machine. Electric machine 200 generally includes a housing 216, an adaptor plate 218, a motor heat sink 220, a motor assembly 222, a motor enclosure 224, a top housing 228, a fan assembly 230, an electronics heat sink 232, an electronics enclosure 234, a controller board or electronics component 236, and an inlet cover 238.

In the exemplary embodiment, housing 216 is generally defined by adaptor plate 218, motor enclosure 224, top housing 228, electronics enclosure 234, and inlet cover 238. Motor assembly 222 generally includes a stator 244, a rotor 246 coupled to a shaft 248, and a plurality of permanent magnets 249 coupled to rotor 246 in any suitable configuration. In the exemplary embodiment, stator 244 is oriented adjacent rotor 246 in an axial flux producing configuration. Alternatively, stator 244 may be oriented in a radial flux producing configuration. Fan assembly 230 generally includes a fan 250, a cowl 251, and a fan inlet 252. Fan 250 is coupled to a shaft first end 254, and a shaft second end 256 extends from housing 216. Motor assembly 222 and fan assembly 230 operate in a manner similar to motor assembly 22 and fan assembly 30.

In the exemplary embodiment, electronics enclosure 234 includes an inner cavity 258 defined by a controller housing 240 and inlet cover 238. Electronic control 236 is mounted within electronics enclosure 234 and facilitates control of motor assembly 222. Electronics enclosure 234 is substantially air-tight and inner cavity 258 is substantially thermally isolated from other portions of electric machine 200. In particular, inner cavity 258 is substantially thermally isolated from motor enclosure 224 to facilitate preventing transfer of thermal energy to electronic control 236.

Electronic control 236 is thermally coupled to electronics heat sink 232, which facilitates removal of thermal energy generated by electronic control 236 from electronics enclosure 234. In the exemplary embodiment, electronics heat sink 232 includes a body portion 262 having a plurality of heat fins 264 extending therefrom. Heat fins 264 may have any suitable shape and configuration that enables heat sink 232 to function as described herein. Body portion 262 is thermally coupled to electronics control 236 and transfers thermal energy generated by electronics control 236 out of inner cavity 258 via heat fins 264, as described herein in more detail.

In the exemplary embodiment, motor enclosure 224 includes an inner cavity 266 defined by adaptor plate 218, motor enclosure 224, and motor heat sink 220. Motor assembly 222 is mounted within motor enclosure 224, and shaft first end 254 extends through an aperture 268 defined in motor enclosure 24. Shaft second end 256 extends through an aperture 270 defined in heat sink 220 and through an aperture 272 defined in adaptor plate 218. Aperture 270 is sealed by shaft 248 and bearings 274 such that air does not pass therethrough. Motor enclosure 224 is substantially air-tight and inner cavity 266 is substantially thermally isolated from other portions of electric machine 200. In particular, inner cavity 266 is substantially thermally isolated from electronics enclosure 234 to facilitate preventing transfer of thermal energy to electronic control 236.

Motor assembly 222 is thermally coupled to motor heat sink 220, which facilitates removal of thermal energy generated by motor assembly 222 from motor enclosure 224. In the exemplary embodiment, motor heat sink 220 extends through aperture 268 and includes a body portion 276 and a plurality of radial heat fins 278 extending therefrom. Body portion 276 is thermally coupled to stator 244 and thermal energy produced by stator 244 is transferred out of inner cavity 266 via heat fins 278, as described herein in more detail.

As shown in FIG. 7, electric machine 200 includes air cooling system 202 defined by housing 216. Air cooling system 202 generally includes a first air intake 280, a second air intake 282, and an air outlet 284 fluidly connected by an air passage 286 defined through housing 216. In the exemplary embodiment, air passage 286 facilitates a flow of cooling airflow (shown by arrows 288) therethrough to dissipate heat from electronics heat sink 232 and motor heat sink 220. Air passage 286 includes a motor air passage 290, an electronics air passage 292, and an exhaust passage 294.

In the exemplary embodiment, heat fins 264 are oriented at least partially within motor air passage 290 and heat fins 278 are oriented at least partially within electronics air passage 292. Fan 250 is coupled to shaft first end 254 and is rotatably mounted within exhaust passage 294. Rotation of fan 250 facilitates pulling air into air intakes 280 and 282 such that the cooling airflow is directed through electronics air passage 292. The cooling airflow contacts electronics heat sink 232 and removes heat generated by electronics component 236 through electronics heat sink body 262 and heat fins 264. Similarly, the cooling airflow flows through motor air passage 290 where the cooling airflow contacts motor heat sink 220 and removes heat generated by motor assembly 22 and transferred through motor heat sink body 276 and heat fins 278. The cooling airflows from passages 290 and 292 are combined and pass through exhaust passage 294, and the combined heated airflow is subsequently exhausted from housing 216 through air outlet 284. Alternatively, motor air passage 290 and electronics air passage 292 may not be fluidly connected and, instead, each passage 290 and 292 connects to separate exhaust passages (not shown). Accordingly, one fan is rotatably mounted in each separate exhaust passage to facilitate a cooling airflow through the separate air passages.

An exemplary method of assembling electric machine 200 is described herein. The method includes providing housing 216 having first air intake 280, second air intake 282, air outlet 284, and air passage 286 extending between air intakes 280 and 282 and air outlet 284. Motor enclosure 224 and electronics enclosure 234 are formed within housing 216 and are substantially thermally isolated from each other. Motor assembly 222 is coupled within motor enclosure 224 and electronics component 236 is coupled within electronics enclosure 234. Motor heat sink 220 is thermally coupled to motor assembly 222 and is positioned at least partially within motor air passage 290. Electronics heat sink 232 is thermally coupled to electronics component 236 and is positioned at least partially within electronics air passage 292. Fan 250 is rotatably mounted within exhaust passage 294 to shaft 248 downstream of motor heat sink 220 and electronics heat sink 232, and generally between motor enclosure 224 and electronics enclosure 234.

Described herein are systems and methods for air cooling an electric machine such as a motor or a generator. The electric machine includes a housing having at least one air intake, an air outlet, and an air passage between the at least one air intake and air outlet. Substantially air-tight enclosures for a motor assembly and electronics components are formed within the housing. Heat sinks thermally couple the enclosures and the air passage such that a cooling airflow through the air passage facilitates cooling of the components within the enclosures. In one aspect, the electronics enclosure heat sink is located within the air passage upstream of the motor enclosure heat sink. Moreover, the enclosures are substantially thermally isolated from each other at least by the air passage to prevent transfer of thermal energy between the enclosures. Accordingly, the electronics components are cooled and protected from other heat generating components of the electric machine to prevent thermal degradation and to facilitate longer life of the electronics components. The electric machine described herein enables cooling air to be better concentrated over hot areas of the system Further, a fan is rotatably mounted within the air passage internally within the electric machine to facilitate the cooling airflow through the air passage and to prevent external access to the moving fan. Because the fan is located internally within the electric machine (i.e., not accessible from outside the housing), the electric machine produces less audible noise pollution and prevents injuries associated with contacting the fan.

In another aspect, the housing includes two air intakes that are each connected to the air outlet by the air passage. The cooling airflow flows through each of the two air intakes and separately past the motor heat sink and the electronics heat sink. The two cooling airflows are subsequently combined and exhausted through the air outlet.

In yet another aspect, a locking passage is formed in the housing and a locking aperture is formed in a motor shaft. An object may be inserted into the locking passage and the locking aperture to prevent rotation of the shaft. This facilitates rotatably locking the shaft for ease of assembly and disassembly of the electric machine from a system driven by the electric machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:
   a housing including at least one air intake, an air outlet, and an air passage extending between the at least one air intake and the air outlet;
   a substantially air-tight electronics enclosure comprising a first heat sink positioned at least partially within the air passage;
   a substantially air-tight motor enclosure, wherein said electronics enclosure and said motor enclosure are substantially thermally isolated from each other within said housing at least partially by the air passage;
   a second heat sink positioned within said motor enclosure and at least partially within the air passage downstream of said first heat sink, wherein a cooling airflow through the at least one air intake flows through the air passage to cool said first heat sink and said second heat sink before the cooling airflow is exhausted through the air outlet; and
   a fan positioned within said motor enclosure and at least partially within the air passage between said first heat sink and said second heat sink, said fan configured to draw the cooling airflow into the electric machine through the at least one air intake and across said first heat sink.

2. The electric machine of claim 1, further comprising an electronics component and a motor assembly, wherein said first heat sink is an electronics heat sink configured to thermally couple to said electronics component, and said second heat sink is a motor heat sink configured to thermally couple to said motor.

3. The electric machine of claim 1, wherein said electronics enclosure includes an electronics component therein, said electronics component thermally coupled to said first heat sink.

4. The electric machine of claim 3, further comprising a first air opening and a second air opening between the air passage and said electronics enclosure, the first air opening positioned along the air passage downstream of said first heat sink and the second air opening, wherein the first and second air openings are configured to enable at least a portion of the cooling airflow to flow through the first air opening into said electronics enclosure and out the second air opening back to the air passage at a location upstream of the first air opening.

5. The electric machine of claim 1, wherein said a motor enclosure includes a motor assembly therein, said motor assembly thermally coupled to said second heat sink.

6. The electric machine of claim 5, further comprising a first air opening and a second air opening between the air passage and said motor enclosure, the first air opening positioned along the air passage downstream of said first heat sink and the second air opening, wherein the first and second air openings are configured to enable at least a portion of the cooling airflow to flow through the first air opening into said motor enclosure and out the second air opening back to the air passage at a location downstream of said first heat sink.

7. The electric machine of claim 1, wherein the at least one air intake comprises a first air intake and a second air intake, and wherein the cooling airflow through the first air intake flows through a first portion of the air passage to cool said first heat sink, the cooling airflow through the second air intake flows through a second portion of the air passage to cool said second heat sink, and the cooling airflow through the first and second portions of the air passage flows through a third portion of the air passage and is exhausted through the air outlet.

8. The electric machine of claim 1, further comprising:
a shaft rotatably coupled at least partially within said housing, said shaft including a locking aperture extending at least partially therethrough; and
a locking passage extending through said housing adjacent the locking aperture, wherein the locking passage is configured to receive an object such that the object extends into the locking aperture to prevent rotation of said shaft.

9. A motor comprising:
a housing including at least one air intake, an air outlet, and an air passage extending between the at least one air intake and the air outlet;
a substantially air-tight electronics enclosure comprising a first heat sink positioned at least partially within the air passage;
a substantially air-tight motor enclosure, wherein said electronics enclosure and said motor enclosure are substantially thermally isolated from each other within said housing at least partially by the air passage;
a second heat sink positioned within said motor enclosure and at least partially within the air passage downstream of said first heat sink, wherein a cooling airflow through the at least one air intake flows through the air passage to cool said first heat sink and said second heat sink before the cooling airflow is exhausted through the air outlet; and
a fan positioned within said motor enclosure and at least partially within the air passage between said first heat sink and said second heat sink, said fan configured to draw the cooling airflow into the electric machine through the at least one air intake and across said first heat sink.

10. The motor of claim 9, further comprising:
a shaft rotatably coupled to said housing;
a rotor coupled to said shaft;
a stator adjacent said rotor, said stator thermally coupled to said second heat sink; and
an electronics component thermally coupled to said first heat sink.

11. The motor of claim 10, wherein said electronics component is positioned within said electronics enclosure and said rotor and said stator are positioned within said motor enclosure.

12. The motor of claim 10, wherein the at least one air intake comprises a first air intake and a second air intake, and wherein the cooling airflow through the first air intake flows through a first portion of the air passage to cool said first heat sink, the cooling airflow through the second air intake flows through a second portion of the air passage to cool said second heat sink, and the cooling airflow through the first and second portions of said the passage flows through a third portion of the air passage and is exhausted through the air outlet.

13. The motor of claim 10, wherein said shaft includes a locking aperture extending at least partially therethrough, and a locking passage extends through said housing adjacent the locking aperture, wherein the locking passage is configured to receive an object such that the object extends into the locking aperture to prevent rotation of said shaft.

14. A method of fabricating an electric motor, said method comprising:
providing a housing including at least one air intake, an air outlet, and an air passage extending between the at least one air intake and the air outlet;
positioning a substantially air-tight electronics enclosure including a first heat sink at least partially within the air passage;
providing a substantially air-tight motor enclosure within the housing, wherein the electronics enclosure and the motor enclosure are substantially thermally isolated from each other within the housing at least partially by the air passage;
positioning a second heat sink within said motor enclosure and at least partially within the air passage downstream of the second heat sink, wherein a cooling airflow through the at least one air intake flows through the air passage to cool the first heat sink and the second heat sink before the cooling airflow is exhausted through the air outlet; and
rotatably mounting a fan within the motor enclosure and at least partially within the air passage downstream of the first heat sink and upstream of the second heat sink, wherein the fan is configured to pull the cooling airflow into the at least one air intake.

15. The method of claim 14, further comprising forming an electronics enclosure within the housing, positioning an electronics component within the electronics enclosure, and thermally coupling the electronics component to the first heat sink.

16. The method of claim 15, further comprising forming a first air opening and a second air opening between the air passage and the electronics enclosure, the first air opening positioned along the air passage downstream of the first heat sink and the second air opening, wherein at least a portion of the cooling airflow is directed through the first air opening into the electronics enclosure and out the second air opening to a location upstream of the first air opening.

17. The method of claim 14, further comprising forming a substantially air-tight motor enclosure within the housing, positioning a rotor and a stator within the motor enclosure, and thermally coupling the motor to the second heat sink.

18. The method of claim 17, further comprising forming a first air opening and a second air opening between the air passage and the motor enclosure, the first air opening positioned along the air passage downstream of the first heat sink and the second air opening, wherein at least a portion of the cooling airflow is directed through the first air opening into the motor enclosure and out the second air opening back into the air passage at a location downstream of the first heat sink.

19. The method of claim 14, wherein forming the housing comprises forming a housing including a first air intake, a second air intake, an air outlet, and an air passage between the first and second air intakes and the air outlet, wherein the cooling airflow through the first air intake flows through a first portion of the air passage to cool the first heat sink, the cooling airflow through the second air intake flows through a second portion of the air passage to cool the second heat sink, and the cooling airflow through the first and second portions of the air passage flows through a third portion of the air passage and is exhausted through the air outlet.

20. The method of claim 14, further comprising:
rotatably coupling a shaft at least partially within the housing, the shaft including a locking aperture extending at least partially therethrough; and
forming a locking passage through the housing adjacent to the locking aperture, wherein the locking passage is configured to receive an object such that the object extends into the locking aperture to prevent rotation of the shaft.

* * * * *